(12) United States Patent
Namikawa et al.

(10) Patent No.: US 9,711,283 B2
(45) Date of Patent: Jul. 18, 2017

(54) THIN FILM CAPACITOR

(71) Applicant: TDK CORPORATION, Tokyo (JP)

(72) Inventors: Tatsuo Namikawa, Tokyo (JP); Yoshihiko Yano, Tokyo (JP); Yasunobu Oikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 24 days.

(21) Appl. No.: 14/706,486

(22) Filed: May 7, 2015

(65) Prior Publication Data

US 2015/0325368 A1 Nov. 12, 2015

(30) Foreign Application Priority Data

May 12, 2014 (JP) .................. 2014-098320

(51) Int. Cl.
| | | |
|---|---|---|
| *H01G 4/30* | (2006.01) | |
| *H01G 2/10* | (2006.01) | |
| *H01G 4/10* | (2006.01) | |
| *H01G 4/33* | (2006.01) | |
| *H01G 4/008* | (2006.01) | |

(52) U.S. Cl.
CPC .............. *H01G 2/10* (2013.01); *H01G 2/103* (2013.01); *H01G 4/008* (2013.01); *H01G 4/10* (2013.01); *H01G 4/33* (2013.01)

(58) Field of Classification Search
CPC ....................................... H01G 4/30
USPC ............................................... 361/311, 301.4
See application file for complete search history.

(56) References Cited

U.S. PATENT DOCUMENTS

| | | | | |
|---|---|---|---|---|
| 2006/0245139 A1* | 11/2006 | Kariya | ................... | H01G 4/232 361/272 |
| 2008/0145996 A1 | 6/2008 | Nomura et al. | | |
| 2008/0186654 A1* | 8/2008 | Takeshima | ............. | H01G 4/232 361/313 |
| 2009/0242257 A1* | 10/2009 | Kakei | ................... | H05K 1/162 174/260 |

FOREIGN PATENT DOCUMENTS

| | | | |
|---|---|---|---|
| JP | 2003-347157 A | | 12/2003 |
| JP | 2008-153497 A | | 7/2008 |
| JP | 2011077343 A | * | 4/2011 |

* cited by examiner

*Primary Examiner* — Eric Thomas
(74) *Attorney, Agent, or Firm* — Oliff PLC

(57) ABSTRACT

A thin film capacitor includes: a laminated body in which a dielectric layer and an upper electrode layer are successively laminated on a base electrode; a protective layer that covers a part of the base electrode, the dielectric layer and the upper electrode layer and includes a through-hole respectively on the base electrode and on the upper electrode layer; and terminal electrodes that are electrically connected with the base electrode and the upper electrode layer through the through-holes of the protective layer. A modulus of longitudinal elasticity (Young's modulus) of the protective layer is 0.1 GPa to 2.0 GPa.

3 Claims, 3 Drawing Sheets

THIN FILM CAPACITOR

TECHNICAL FIELD

The present invention relates to a thin film capacitor.

BACKGROUND

A thin film capacitor includes a capacitor element in which a lower electrode layer, a dielectric layer and an upper electrode layer are successively laminated, and a protective layer that covers it. The protective layer is provided with an exposure part for connecting the lower electrode layer or the upper electrode layer with a terminal electrode.

An example of such a thin film capacitor is disclosed in Japanese Patent Application Laid-Open No. 2008-153497 and Japanese Patent Application Laid-Open No. 2003-347157.

SUMMARY

One of functions of the protective layer is adding moisture resistance to the capacitor element. Therefore, it is desirable that the protective layer can maintain a shape even when deformation occurs during use of the capacitor element. The inventors have found that it is difficult for a conventional protective layer to maintain the shape of the protective layer for a long period of time.

For example, in the thin film capacitors described in Japanese Patent Application Laid-Open No. 2008-153497 and Japanese Patent Application Laid-Open No. 2003-347157, the dielectric layer is expanded and contracted when use is continued for a long period of time. Stress that generates warp in the protective layer is generated by the expansion and contraction of the dielectric layer, and a crack is sometimes generated in the protective layer. By the crack, the moisture resistance of the thin film capacitor is easily degraded. Such degradation tends to occur also when mounting the thin film capacitor, and the crack is sometimes caused around an opening due to the stress during electrical connection.

The present invention is implemented in consideration of the above-described problem, and an object is to provide a thin film capacitor that can maintain high moisture resistance.

The thin film capacitor according to the present invention comprises a laminated body for which a dielectric layer and an upper electrode layer are successively laminated on a base electrode, a protective layer that covers a part of the base electrode, the dielectric layer and the upper electrode layer and includes a through-hole respectively on the base electrode and the upper electrode layer, and a pair of terminal electrodes that are electrically connected with the base electrode and the upper electrode layer through the through-holes of the protective layer. At the time, a modulus of longitudinal elasticity (It is generally called "Young's modulus". Hereinafter, it is simply called "Young's modulus".) of the protective layer is 2.0 GPa or smaller. Therefore, by mitigating stress stored in the protective layer by flexibility of the protective layer itself, warp can be suppressed, and crack generation of the protective layer can be prevented. As a result, moisture resistance that the protective layer has is not lost and thus the moisture resistance of the thin film capacitor can be improved.

For the protective layer of the thin film capacitor of the present invention, the Young's modulus is 0.1 GPa or larger. Therefore, the warp due to the stress generated by expansion and contraction during use of the dielectric layer is suppressed by strength of the protective layer. Also, addition of force due to a physical impact from the outside to the dielectric layer can be more efficiently prevented. In addition, there is also an advantage that influence of the stress given to the entire thin film capacitor by thermal contraction of a filler when mounting the thin film capacitor can be reduced.

The thin film capacitor according to the present invention may comprise an insulating layer in addition to the protective layer, the insulating layer may be provided on the base electrode, preferably on a position away from the dielectric layer, and at least one of the terminal electrodes of the thin film capacitor may be stretched from the base electrode onto the insulating layer provided in addition to the protective layer. At the time, it is preferable that the Young's modulus of the insulating layer is 3.0 GPa to 5.0 GPa. By this configuration, a metal layer with a large thermal expansion coefficient difference from the dielectric layer of the thin film capacitor can be fixed away from the dielectric layer. Thus, propagation to the terminal electrodes of the stress in a direction of generating warp, which is generated by the expansion and contraction during use of the dielectric layer can be avoided. As a result, the crack generation of the protective layer can be more effectively avoided. In addition, since electrical connection upon mounting can be stabilized, there is also an advantage that the moisture resistance of the thin film capacitor can be more improved.

It is preferable that the base electrode of the thin film capacitor of the present invention is Ni foil. It is known that the Ni foil is a material having oxidation resistance and low electric resistance, and is preferable as an electrode material of an oxide dielectric element like the thin film capacitor. In addition, it has high hardness and Young's modulus compared to other representative conductive materials (metals such as Cu or Al). Therefore, the lower electrode contributes to shape maintenance of the protective layer and the insulating layer, and suppression of the crack generation of the protective layer, which is an effect of the present invention, will be further improved.

According to the thin film capacitor according to the present invention, the thin film capacitor having the high moisture resistance can be provided.

DETAILED DESCRIPTION

Hereinafter, a preferred embodiment of the present invention will be described. However, the present invention is not limited to the following embodiment. The same signs are attached to the same or equivalent elements, and in the case that description overlaps, the description will be omitted.

Figure 1:
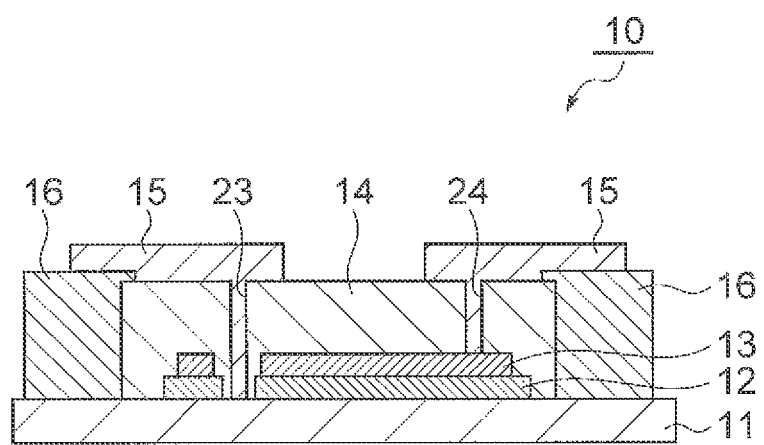
FIG. 1 is a schematic sectional view illustrating a structure of a thin film capacitor according to one embodiment of the present invention.

FIG. 1 is a schematic sectional view illustrating a structure of a thin film capacitor according to the present embodiment. A thin film capacitor 10 comprises a base electrode 11;

a dielectric layer 12 laminated on the base electrode 11; an upper electrode layer 13 laminated on the dielectric layer 12; a protective layer 14 as a surface protective film for a part of the base electrode 11, the dielectric layer 12 and the upper electrode layer 13; terminal electrodes 15; and an insulating layer 16 for insulating the terminal electrodes 15. Here, the insulating layer 16 in the present embodiment may be formed on the dielectric layer 12 or formed on the base electrode 11 without presence of the dielectric layer 12.

The base electrode 11 is not limited in particular as long as it is a material with conductivity. As the material of the base electrode, a metal, an oxide, an organic conductive material or the like can be appropriately selected. As the material having high electric conductivity, for example, at least one of Ni, Pt, Pd, Ir, Ru, Rh, Re, Os, Au, Ag, Cu, $IrO_2$, $RuO_2$, $SrRuO_3$ and $LaNiO_3$ may be included. It is preferable that a film thickness of the base electrode 11 is 50-2000 nm from a viewpoint of electric conductivity and mechanical strength. In the case of being below 50 nm, sometimes electric resistance of the base electrode 11 becomes large and an electric characteristic of the thin film capacitor is lowered. In the case of being over 2000 nm, a pressure exerted to the dielectric layer 12 by internal stress of the base electrode 11 tends to be remarkable. The base electrode 11 may be provided on a substrate (not shown in the figure) of Si or alumina, or the base electrode 11 may have a function of the substrate. In this case, the base electrode 11 and the substrate are of the same material. For example, foil or a plate whose main component is a base metal such as Ni, Cu or Al or an alloy thereof, or a plate or foil of stainless steel, Inconel® or the like can be suitably used. In particular, Ni foil is preferable since it has high conductivity, also has high hardness and Young's modulus, and contributes to shape maintenance of the protective layer 14 and the insulating layer 16. It is preferable that a thickness of the base electrode 11 in the case that the base electrode 11 and the substrate are of the same material is 5 μm to 500 μm. In the case that the thickness of the base electrode 11 is below 5 μm, the mechanical strength of the base electrode 11 sometimes becomes below a magnitude that can maintain the shape of the protective layer 14 and the insulating layer 16. On the contrary, in the case that the thickness of the base electrode 11 exceeds 500 μm, sometimes a storage amount of distortion due to a thermal history unavoidable in a thin film capacitor manufacturing process becomes large, and the shape maintenance of the protective layer 14 and the insulating layer 16 is adversely affected. In the present embodiment, a mode of using the Ni foil for the base electrode 11 is illustrated. The base electrode 11 which is the Ni foil has both of a function as a holding member that holds the dielectric layer 12 and the upper electrode layer 13 or the like and a function as a lower electrode. In the case of a form using a substrate/electrode film structure, a structure which is a combination of a substrate/an electrode film is made to correspond to the base electrode 11 of the present embodiment to attain an embodiment of the present invention.

For the dielectric layer 12, a perovskite type oxide such as barium titanate ($BaTiO_3$, called "BT" hereinafter), barium strontium titanate (($BaSr)TiO_3$, called "BST" hereinafter), strontium titanate ($SrTiO_3$, called "ST" hereinafter), calcium zirconate ($CaZrO_3$, $(BaSr)(TiZr)O_3$, called "CZ" hereinafter), or $BaTiZrO_3$ is suitably used. The dielectric layer 12 may be a composite material including one or more of these oxides, or may be a laminated body of the plurality of dielectric layers. It is preferable that a film thickness of the dielectric layer 12 is about 100-1000 nm from a viewpoint of a function of a dielectric element and mechanical strength maintenance. A forming method of the dielectric layer 12 is not limited in particular, and a known dielectric thin film creating method can be appropriately selected and used. For example, a physical vapor phase growth method such as a sputtering method or a vapor deposition method may be used, or a chemical vapor phase growth method such as a plasma CVD method may be used. Or, a solution method of applying and firing a solution containing a starting material may be used.

The upper electrode layer 13 is not limited in particular as long as it is a material having conductivity. A metal, an oxide, an organic conductive material or the like can be appropriately selected. As the material having high electric conductivity, for example, at least one of Ni, Pt, Pd, Ir, Ru, Rh, Re, Os, Au, Ag, Cu, $IrO_2$, $RuO_2$, $SrRuO_3$ and $LaNiO_3$ may be included. In particular, conductive materials configured with Cu, Ni, Pt, Pd, Ir, Ru, Rh, Re, Os, Au and Ag as main components are preferable, and among them, the conductive material configured with Ni as the main component is preferable from a viewpoint of the electrical characteristic and the mechanical strength. The upper electrode layer 13 is not needed to use Ni alone, and it may be a laminated structure of Ni/Cu for example. In this case, a Ni layer side of the upper electrode layer 13 can be brought into contact with a side of the dielectric layer 12 and a Cu side can be turned to the outside. Further, since Cu is highly conductive compared to Ni, by increasing a thickness of Cu compared to that of Ni, the conductivity of the upper electrode layer 13 can be increased.

For the protective layer 14, a material whose Young's modulus is 0.1 GPa or larger and 2.0 GPa or smaller can be appropriately selected and used. For example, an insulating resin such as a polyimide-based resin, an epoxy-based resin, a phenol-based resin, a benzocyclobutene-based resin, a polyamide-based resin, or a fluorine-based resin can be suitably used. In particular, the polyimide-based resin is preferable at a point that moisture absorptivity and water absorptivity are low. The Young's modulus of these materials can be adjusted by appropriately using known means that adjusts a mechanical characteristic of a polymer material. For example, means such as (1) introduction of an alkyl group to a side chain or a molecular chain, (2) introduction of sulfur (vulcanization) to the molecular chain, (3) reduction of crosslinking points (changing an oxygen radical of the molecular chain to a hydrogen end, or the like), and (4) limitation of polymerization reaction by feeding of a polymerization inhibitor in the middle of reaction, can be used.

The Young's modulus of the protective layer 14 can be obtained by a nanoindentation method. While a nanoindenter used in the nanoindentation method is known as a method of evaluating a mechanical characteristic of a thin film, it is needed to obtain a load-displacement curve at such a maximum indentation depth that influence of a base is not received for mechanical strength evaluation of the thin film itself. It is desirable that the Young's modulus of the protective layer 14 described above is a result calculated from the load-displacement curve obtained with the maximum indentation depth being about ⅕ to ⅓ of a film thickness of the protective layer 14 in consideration of the influence of the base. Specifically, it is desirable to perform preliminary measurement with a low load of about 20 mN to 100 mN.

For the terminal electrodes 15, a material with high conductivity can be appropriately selected and used. For example, Au, Ag, Pt, Cu or the like can be used. From a viewpoint of compatibility of the mechanical characteristic and the electric conductivity, a configuration with Cu as a main component is preferable. For an outer layer of the terminal electrode, a layer of Au, Ni, Sn, Pd or the like may be provided. One terminal electrode 15 is connected with the base electrode 11 through an opening (through-hole) 23 of the protective layer 14. The other terminal electrode 15 is connected with the upper electrode layer 13 through an opening (through-hole) 24 of the protective layer 14.

For the insulating layer 16, it is desirable to appropriately select a material whose Young's modulus is 3.0 GPa to 5.0 GPa. For example, an insulating resin such as a polyimide-based resin, an epoxy-based resin, a phenol-based resin, a benzocyclobutene-based resin, a polyamide-based resin, or a fluorine-based resin or the like can be suitably used. Similarly to the case of the protective layer 14, the Young's modulus of the material of the insulating layer 16 can be also adjusted by appropriately using the known means that adjusts the mechanical characteristic of the polymer material. Examples of the means are, again, (1) introduction of an alkyl group to a side chain or a molecular chain, (2) introduction of sulfur (vulcanization) to the molecular chain, (3) reduction of crosslinking points (changing an oxygen radical of the molecular chain to a hydrogen end, or the like), and (4) limitation of polymerization reaction by feeding of a polymerization inhibitor in the middle of reaction. The Young's modulus of the insulating layer 16 can be also obtained using the nanoindentation method similarly to the protective layer 14.

Next, with reference to FIG. 2 and FIG. 3, one example of a manufacturing method of the thin film capacitor 10 according to the present embodiment will be described.

Figure 2:
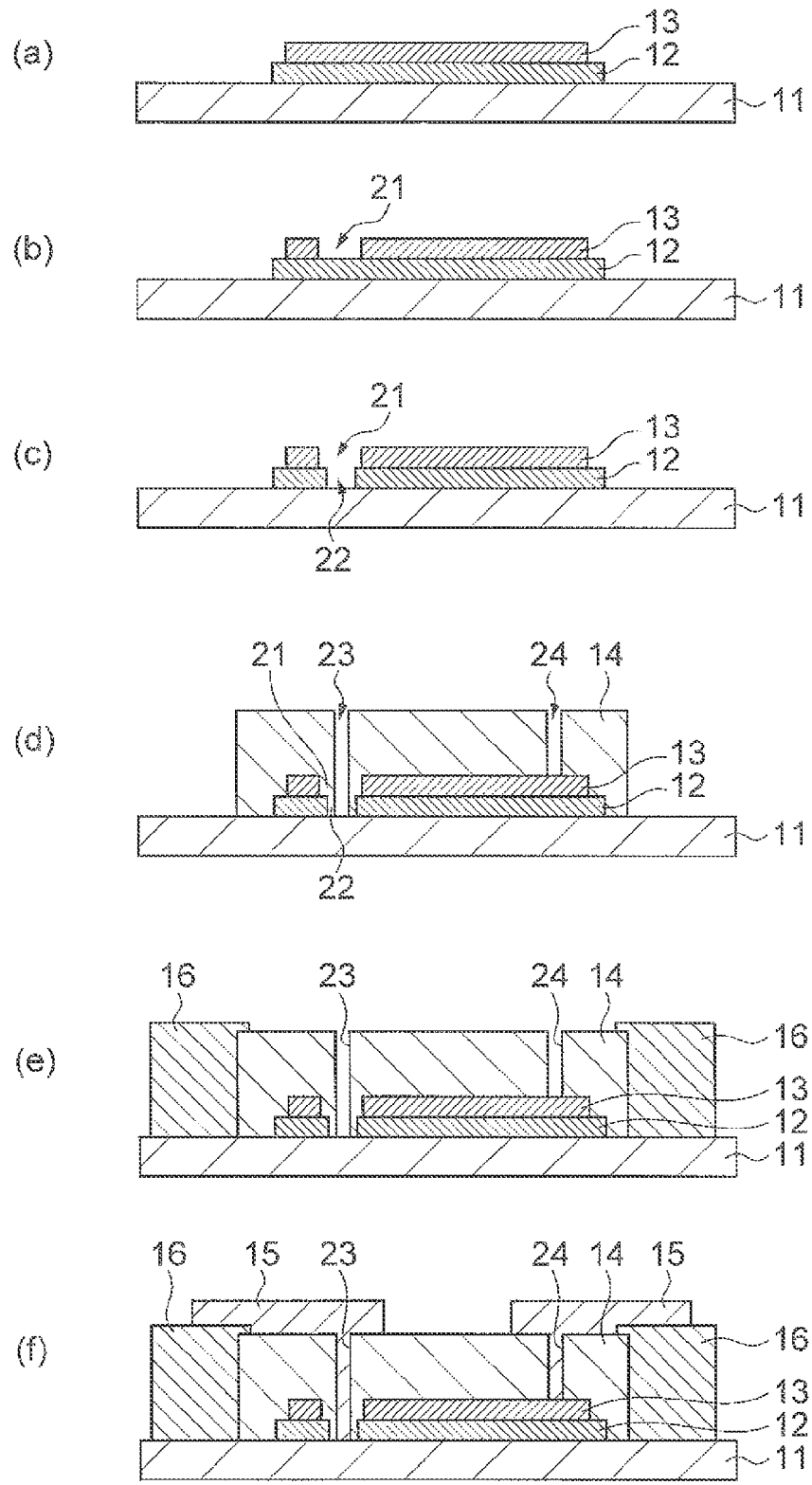
FIG. 2 is a schematic sectional view illustrating a manufacturing method of the thin film capacitor according to one embodiment of the present invention.

First, as illustrated in (a) in FIG. 2, deposition of the dielectric layer 12 and deposition of the upper electrode layer 13 are performed on the base electrode 11, and a laminated body is formed.

Next, as illustrated in (b) in FIG. 2, wet etching is executed in a direction of the base electrode 11 to a part of the upper electrode layer 13, and an opening 21 is formed. When etching the upper electrode layer 13, after executing patterning by photolithography, an etching solution (etchant) of ferric chloride or the like is used.

Next, as illustrated in (c) in FIG. 2, wet etching is executed to a part of the dielectric layer 12 exposed at the opening 21 in a direction of the base electrode 11 from a surface positioned on an opposite side of the base electrode 11 in the laminated body, and an opening 22 is formed. When etching the dielectric layer 12, the etching solution (etchant) that etches a dielectric but does not etch an electrode layer is used. Specifically, in the case that the dielectric film is BT, BST or ST for example, the preferable etchant is a hydrochloric acid+ammonium fluoride aqueous solution. Also, in the case that the dielectric film is CZ, the preferable etchant is a sulfuric acid+ammonium fluoride aqueous solution.

Next, as illustrated in (d) in FIG. 2, the protective layer 14 is formed. At the time, inside the opening 22 and on the upper electrode layer 13 other than the opening 21, the opening 23 reaching the base electrode 11 and the opening 24 reaching the upper electrode layer 13 are provided respectively.

Figure 3:
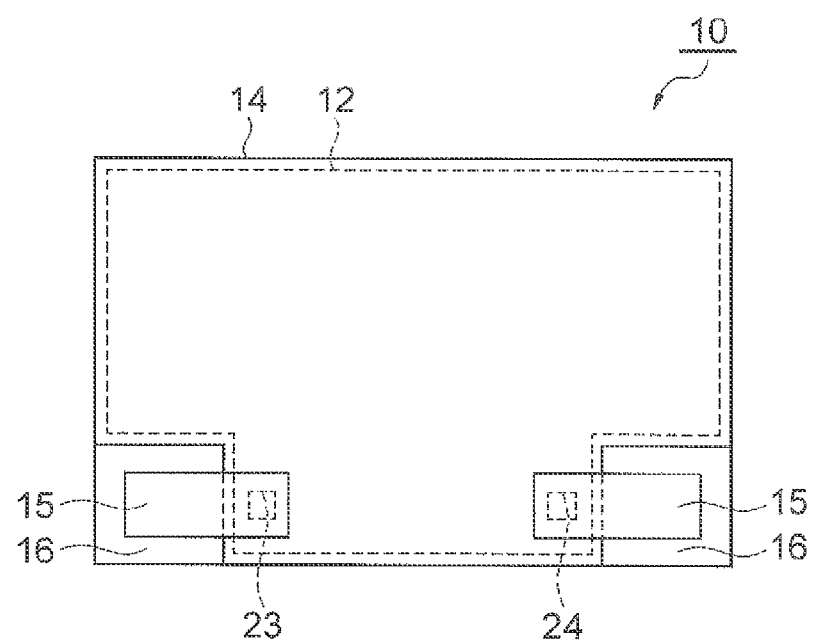
FIG. 3 is a schematic diagram illustrating a representative planar shape regarding a protective layer, an insulating layer and terminal electrodes, in the thin film capacitor according to one embodiment of the present invention.

Then, as illustrated in (e) in FIG. 2 and FIG. 3, the insulating layer 16 is formed, seed deposition and plating are performed further, and the terminal electrodes 15 are formed so as to be connected with the base electrode 11 and the upper electrode layer 13 respectively through the opening 23 and the opening 24 ((f) in FIG. 2).

In such a manner, according to the thin film capacitor 10 according to the present embodiment, since the Young's modulus of the protective layer 14 is 2.0 GPa or smaller, by mitigating the stress stored in the protective layer 14 by the flexibility of the protective layer 14 itself; warp can be suppressed, and crack generation to the protective layer 14 can be prevented. Also, since the Young's modulus of the protective layer 14 is 0.1 GPa or larger, the warp by the stress generated by the expansion and contraction during the use of the dielectric layer 12 is suppressed by the strength of the protective layer 14. Also, addition of force due to a physical impact from the outside to the dielectric layer 12 can be more effectively prevented.

FIG. 3 illustrates a planar schematic diagram of the thin film capacitor 10 according to the present embodiment. The terminal electrodes 15 may be provided only right above the protective layer 14, however, may be also stretched from the above of the protective layer 14 onto the insulating layer 16 formed in addition to the protective layer 14 as in FIG. 3. At the time, by insulating the terminal electrodes from the base electrode 11 using the insulating layer 16 whose Young's modulus is 3.0 GPa to 5.0 GPa, propagation to the terminal electrodes 15 of the stress in a direction of generating the warp, which is generated by the expansion and contraction during the use of the dielectric layer 12 can be avoided. As a result, the crack generation of the protective layer 14 can be more effectively avoided.

Hereinafter, with examples and comparative examples, the present invention will be more specifically described. However, the present invention is not limited by the following examples.

The thin film capacitors 10 having a cross sectional shape illustrated in FIG. 1 were manufactured and evaluated as examples 1-21 and comparative examples 1-3.

Examples 1-9

The Ni foil with a thickness of 100 μm was prepared as the base electrode 11, and a BT layer as the dielectric layer 12 was formed on one surface thereof by the sputtering method so that a dielectric constant (relative dielectric constant) was 1000 and a film thickness was 800 nm. A Ni layer as the upper electrode layer 13 (a lower layer, the side of the dielectric layer 12) was formed by the sputtering method on the dielectric layer 12, and a Cu layer as the upper electrode layer 13 (an upper layer) was formed by the sputtering method on the Ni layer. At the time, an area and a pattern shape of the upper electrode layer 13 and a thickness of the dielectric layer 12 were set so as to turn a capacity to about 8000 pF (8 nF) (see (a) in FIG. 2).

After forming the dielectric layer 12 and the upper electrode layer 13, heat treatment was performed. A resist layer having the opening 21 at a position to perform connection with the base electrode 11 was formed to the upper electrode layer 13 after the heat treatment. A shape of the opening 21 was turned to a square on a mask pattern, and a size was turned to 150 μm×150 μm on the mask pattern. Thereafter, the upper electrode layer 13 of the opening 21 was etched and removed by a ferric chloride solution. Thereafter, the resist layer was peeled (see (b) in FIG. 2).

To the dielectric layer 12 exposed at the position of the opening 21, a resist layer having the opening 22 was formed further. A shape of the opening 22 was turned to a square on the mask pattern, and a size was turned to 100 μm×100 μm on the mask pattern. Thereafter, the dielectric layer 12 of the opening 22 was etched using a liquid mixture of hydrochloric acid and ammonium fluoride aqueous solution. Thereafter, after peeling the resist layer, the heat treatment was performed (see (c) in FIG. 2).

The protective layer 14 was formed using a polyimide resin having photosensitivity. For a material of the polyimide resin, a material in which (1) a normal polyimide monomer and (2) a polyimide monomer to which an alkyl group was bonded were mixed was used. Preliminary test pieces were prepared by changing a mixing ratio of these monomer (1) and monomer (2), and the Young's modulus was obtained. On the basis of a result of a preliminary test, formation was tried so as to obtain the Young's modulus of the protective layer 14 according to the examples at three levels. The Young's modulus of the obtained protective layer 14 was obtained using a nanoindentation system (made by Hysitron Corporation). For measurement, the load displacement curve was obtained 100 times per sample under a condition of the maximum load being 20 mN, the Young's moduli were obtained, and an average value was obtained. The maximum displacement amount was about ¼ or less from a surface for the film thickness of 6 μm of the protective layer 14, and the influence of the base electrode 11 was not recognized. As a result of the measurement, it was confirmed that the Young's modulus of the protective layer 14 was at the three levels of 0.1 GPa, 1.0 GPa, and 2.0 GPa. For the formed protective layer 14, by photolithography, the opening 23 was provided further inside the opening 22, and another opening 24 was provided on a part without the presence of the opening 21 on the upper electrode layer 13. A shape of the opening 23 and the opening 24 was turned to a square on the mask pattern, and a size was turned to 50 μm×50 μm on the mask pattern (see (d) in FIG. 2).

The insulating layer 16 was formed using the polyimide resin having the photosensitivity. A film thickness of the insulating layer 16 was turned to 7 μm. The mixing ratio of the monomers was changed by the same procedure as that in the case of the protective layer 14, and the insulating layer 16 whose Young's modulus was at the three levels of 3.0 GPa, 3.5 GPa and 5.0 GPa was obtained. By the photolithography, a pattern was formed such that the insulating layer 16 remains only at an outer edge part of the protective layer 14 and on an outer side thereof (see (e) in FIG. 2).

By the above-described procedure, the total of 270 pieces (30 pieces per level) of thin film capacitor element assemblies were obtained in which the Young's modulus was changed at nine levels (corresponding to the examples 1-9. See table 1 for the individual levels.) by the three levels for the Young's modulus of the protective layer 14, the three levels for the Young's modulus of the insulating layer 16, and the combinations thereof. To the thin film capacitor element assemblies, the terminal electrodes 15 were formed using Cu. At the time, the terminal electrodes 15 were connected to the base electrode 11 and the upper electrode layer 13 respectively through the opening 23 and the opening 24 exposed at the protective layer 14, and were manufactured in a shape of striding over the protective layer 14 and the insulating layer 16 (see (f) in FIG. 2 and FIG. 3). By the above-described procedure, 270 pieces of the thin film capacitors 10 were obtained. When an average value and a standard deviation of capacitance were calculated for the obtained thin film capacitors 10, the average value was 8.05 nF, and the standard deviation was 0.2 nF. Also, when an insulation resistance value was measured, it was within a range of 1.0 to $2.0\times10^{11}\Omega$.

To the thin film capacitors 10, a moisture resistance reliability test was conducted. In the moisture resistance reliability test, the thin film capacitor 10 was mounted on a printed wiring board and then put into a thermostatic bath adjusted to be 60° C. and 90% RH, and a voltage 4V was applied for 1000 hours. The thin film capacitor 10 in which a resistance value of the thin film capacitor 10 after the lapse of 1000 hours was $\frac{1}{100}$ or smaller of the insulation resistance value before it was put in the thermostatic bath was determined as NG, and the number of NGs was counted and defined as an evaluation result.

Examples 10, 11

The thin film capacitors 10 were manufactured by the procedure similar to that of the examples 1-9 except for that the Young's modulus of the protective layer 14 was fixed at one level of 0.1 GPa and the Young's modulus of the insulating layer 16 was turned to two levels of 2.7 GPa (example 10) and 5.4 GPa (example 11), and evaluations similar to that for the examples 1-9 were made.

When the capacitances of the obtained thin film capacitors 10 were measured and the average value and the standard deviation were calculated, the average value was 8.02 nF, and the standard deviation was 0.17 nF. Also, when the insulation resistance value was measured, it was within the range of 1.0 to $2.0\times10^{11}\Omega$.

Examples 12, 13

The thin film capacitors 10 were manufactured by the procedure similar to that of the examples 1-9 except for that the Young's modulus of the protective layer 14 was fixed at one level of 1.0 GPa and the Young's modulus of the insulating layer 16 was turned to two levels of 2.7 GPa (example 12) and 5.4 GPa (example 13), and evaluations similar to that for the examples 1-9 were made.

When the capacitances of the obtained thin film capacitors 10 were measured and the average value and the standard deviation were calculated, the average value was 8.02 nF, and the standard deviation was 0.17 nF. Also, when the insulation resistance value was measured, it was within the range of 1.0 to $2.0\times10^{11}\Omega$.

Examples 14, 15

The thin film capacitors 10 were manufactured by the procedure similar to that of the examples 1-9 except for that the Young's modulus of the protective layer 14 was fixed at one level of 2.0 GPa and the Young's modulus of the insulating layer 16 was turned to two levels of 2.7 GPa (example 14) and 5.4 GPa (example 15), and evaluations similar to that for the examples 1-9 were made.

When the capacitances of the obtained thin film capacitors 10 were measured and the average value and the standard deviation were calculated, the average value was 8.02 nF, and the standard deviation was 0.17 nF. Also, when the insulation resistance value was measured, it was within the range of 1.0 to $2.0\times10^{11}\Omega$.

Examples 16, 17

The thin film capacitors 10 were manufactured by the procedure similar to that of the examples 1-9 except for that the Young's modulus of the protective layer 14 was turned to two levels of 0.1 GPa (example 16) and 2.0 GPa (example 17), the insulating layer 16 was not provided, and the terminal electrodes 15 were provided on the protective layer 14, and the similar moisture resistance reliability test was conducted.

When the capacitances of the obtained thin film capacitors 10 were measured and the average value and the standard deviation were calculated, the average value was 8.01 nF, and the standard deviation was 0.22 nF, Also, when the insulation resistance value was measured, it was within the range of 1.0 to $2.0\times10^{11}\Omega$.

Example 18

The thin film capacitors 10 were manufactured by the procedure similar to that of the examples 1-9 except for that the base electrode 11 was the one in which a Ni thin film, with the thickness of 600 nm was formed on an alumina substrate with the thickness of 500 μm, the Young's modulus of the protective layer 14 was fixed at one level of 1.0 GPa, the insulating layer 16 was not provided, and the terminal electrodes 15 were provided on the protective layer 14, and the similar moisture resistance reliability test was conducted.

When the capacitances of the obtained thin film capacitors 10 were measured and the average value and the standard deviation were calculated, the average value was 8.06 nF, and the standard deviation was 0.14 nF. Also, when the insulation resistance value was measured, it was within the range of 1.0 to $2.0\times10^{11}\Omega$.

Examples 19, 20

The thin film capacitors 10 were manufactured by the procedure similar to that of the examples 1-9 except for that the base electrode 11 was the one in which a Ni thin film with the thickness of 600 nm was formed on an alumina substrate with the thickness of 500 μm, the Young's modulus of the protective layer 14 was fixed at one level of 1.0 GPa, and the Young's modulus of the insulating layer 16 was turned to two levels of 2.7 GPa (example 19) and 5.4 GPa (example 20), and the similar moisture resistance reliability test was conducted. When the capacitances of the obtained thin film capacitors 10 were measured and the average value and the standard deviation were calculated, the average value was 8.07 nF, and the standard deviation was 0.13 nF. Also, when the insulation resistance value was measured, it was within the range of 1.0 to $2.0\times10^{11}\Omega$.

Example 21

The thin film capacitors 10 were manufactured by the procedure similar to that of the examples 1-9 except for that the base electrode 11 was the one in which a Ni thin film with the thickness of 600 nm was formed on an alumina substrate with the thickness of 500 μm, the Young's modulus of the protective layer 14 was fixed at one level of 1.0 GPa, and the Young's modulus of the insulating layer 16 was fixed at one level of 3.5 GPa, and the similar moisture resistance reliability test was conducted. When the capacitances of the obtained thin film capacitors 10 were measured and the average value and the standard deviation were calculated, the average value was 8.07 nF, and the standard deviation was 0.14 nF. Also, when the insulation resistance value was measured, it was within the range of 1.0 to $2.0\times10^{11}\Omega$.

Comparative Examples 1-3

The thin film capacitors 10 were manufactured by the procedure similar to that of the examples 1-9 except for that the Young's modulus of the protective layer 14 was turned to 0.05 GPa (comparative example 1), 2.5 GPa (comparative example 2) and 3.0 GPa (comparative example 3), and the Young's modulus of the insulating layer 16 was fixed at one level of 3.5 GPa, and evaluations similar to that for the examples 1-9 were made. When the capacitances of the obtained thin film capacitors 10 were measured and the average value and the standard deviation were calculated, the average value was 7.98 nF, and the standard deviation was 0.15 nF. Also, when the insulation resistance value was measured, it was within the range of 1.0 to $2.0\times10^{11}\Omega$.

For the examples 1-21 and the comparative examples 1-3 described above, results of the moisture resistance reliability test are indicated in table 1.

TABLE 1

| | Protective layer 14 Young's modulus (GPa) | Insulating layer 16 Young's modulus (GPa) | Base electrode material (structure) | Installation part of terminal electrodes | Moisture resistance reliability test (number of NGs/population) |
|---|---|---|---|---|---|
| Example 1 | 0.1 | 3.0 | Ni foil (100 μm) | On insulating layer 16 | 0/30 |
| Example 2 | 1.0 | 3.0 | Ni foil (100 μm) | On insulating layer 16 | 0/30 |
| Example 3 | 2.0 | 3.0 | Ni foil (100 μm) | On insulating layer 16 | 0/30 |
| Example 4 | 0.1 | 3.5 | Ni foil (100 μm) | On insulating layer 16 | 0/30 |
| Example 5 | 1.0 | 3.5 | Ni foil (100 μm) | On insulating layer 16 | 0/30 |
| Example 6 | 2.0 | 3.5 | Ni foil (100 μm) | On insulating layer 16 | 0/30 |
| Example 7 | 0.1 | 5.0 | Ni foil (100 μm) | On insulating layer 16 | 0/30 |
| Example 8 | 1.0 | 5.0 | Ni foil (100 μm) | On insulating layer 16 | 0/30 |
| Example 9 | 2.0 | 5.0 | Ni foil (100 μm) | On insulating layer 16 | 0/30 |
| Example 10 | 0.1 | 2.7 | Ni foil (100 μm) | On insulating layer 16 | 2/30 |
| Example 11 | 0.1 | 5.4 | Ni foil (100 μm) | On insulating layer 16 | 2/30 |
| Example 12 | 1.0 | 2.7 | Ni foil (100 μm) | On insulating layer 16 | 2/30 |
| Example 13 | 1.0 | 5.4 | Ni foil (100 μm) | On insulating layer 16 | 2/30 |
| Example 14 | 2.0 | 2.7 | Ni foil (100 μm) | On insulating layer 16 | 3/30 |
| Example 15 | 2.0 | 5.4 | Ni foil (100 μm) | On insulating layer 16 | 3/30 |
| Example 16 | 0.1 | — | Ni foil (100 μm) | On protective layer 14 | 5/30 |
| Example 17 | 2.0 | — | Ni foil (100 μm) | On protective layer 14 | 4/30 |
| Example 18 | 1.0 | — | Alumina substrate/Ni layer (600 nm) | On protective layer 14 | 8/30 |
| Example 19 | 1.0 | 2.7 | Alumina substrate/Ni layer (600 nm) | On insulating layer 16 | 5/30 |
| Example 20 | 1.0 | 5.4 | Alumina substrate/Ni layer (600 nm) | On insulating layer 16 | 4/30 |

TABLE 1-continued

| | Protective layer 14 Young's modulus (GPa) | Insulating layer 16 Young's modulus (GPa) | Base electrode material (structure) | Installation part of terminal electrodes | Moisture resistance reliability test (number of NGs/population) |
|---|---|---|---|---|---|
| Example 21 | 1.0 | 3.5 | Alumina substrate/Ni layer (600 nm) | On insulating layer 16 | 2/30 |
| Comparative example 1 | 0.05 | 3.5 | Ni foil (100 μm) | On insulating layer 16 | 28/30 |
| Comparative example 2 | 2.5 | 3.5 | Ni foil (100 μm) | On insulating layer 16 | 30/30 |
| Comparative example 3 | 3.0 | 3.5 | Ni foil (100 μm) | On insulating layer 16 | 30/30 |

As indicated in table 1, it is confirmed that the high moisture resistance is secured for the thin film capacitor obtained by implementation of the present invention.

REFERENCE SIGNS LIST

10 . . . thin film capacitor, 11 . . . base electrode, 12 . . . dielectric layer, 13 . . . upper electrode layer, 14 . . . protective layer, 15 . . . terminal electrode, 16 . . . insulating layer, 21 . . . opening, 22 . . . opening, 23 . . . opening, 24 . . . opening.

What is claimed is:

1. A thin film capacitor comprising:
   a laminated body in which a dielectric layer and an upper electrode layer are successively laminated on a base electrode;
   a protective layer that covers a part of the base electrode, the dielectric layer and the upper electrode layer and includes a through-hole respectively on the base electrode and the upper electrode layer, a lower surface of the protective layer being in direct contact with the base electrode;
   an insulating layer in addition to the protective layer on the base electrode, a lower surface of the insulating layer being in direct contact with the base electrode; and
   a pair of terminal electrodes that are electrically connected with the base electrode and the upper electrode layer through the through-holes of the protective layer, at least one of the terminal electrodes being a single layer and being in direct contact with an upper surface of the protective layer and an upper surface of the insulating layer,
   wherein a modulus of longitudinal elasticity (Young's modulus) of the protective layer is 0.1 GPa to 2.0 GPa.

2. The thin film capacitor according to claim 1, wherein a modulus of longitudinal elasticity (Young's modulus) of the insulating layer is 3.0 GPa to 5.0 GPa.

3. The thin film capacitor according to claim 1, wherein the base electrode is Ni foil.

* * * * *